US012809363B2

(12) United States Patent
Geißelsöder et al.

(10) Patent No.: US 12,809,363 B2
(45) Date of Patent: Nov. 24, 2026

(54) DEVICE AND METHOD FOR IDENTIFYING ANOMALIES IN AN INDUSTRIAL SYSTEM FOR IMPLEMENTING A PRODUCTION PROCESS

(71) Applicant: Siemens Aktiengesellschaft, Munich (DE)

(72) Inventors: Stefan Geißelsöder, Buckenhof (DE); Klaus-Peter Hitzel, Nuremberg (DE); Hakan Dilek, Herzogenaurach (DE); Christian Klaus Hertlein, Erlangen (DE); Marcel Mathias Klose, Altdorf (DE); Christian Tauber, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 633 days.

(21) Appl. No.: 18/029,277

(22) PCT Filed: Sep. 17, 2021

(86) PCT No.: PCT/EP2021/075610

§ 371 (c)(1),
(2) Date: Mar. 29, 2023

(87) PCT Pub. No.: WO2022/069258

PCT Pub. Date: Apr. 7, 2022

(65) Prior Publication Data

US 2023/0376024 A1 Nov. 23, 2023

(30) Foreign Application Priority Data

Sep. 30, 2020 (EP) .................................... 20199293

(51) Int. Cl.
*G05B 23/02* (2006.01)

(52) U.S. Cl.
CPC ...... *G05B 23/0254* (2013.01); *G05B 23/0281* (2013.01)

(58) Field of Classification Search
CPC ............ G05B 23/0254; G05B 23/0281; G05B 23/0221; G05B 2219/24015;
(Continued)

(56) References Cited

U.S. PATENT DOCUMENTS 5,877,954 A 3/1999 Klimasauskas et al.
2015/0324329 A1* 11/2015 Blevins ................ G05B 23/024
(Continued)

FOREIGN PATENT DOCUMENTS

CN 107797537 3/2018
CN 109947072 6/2019
(Continued)

OTHER PUBLICATIONS

Sebastian Faltinski, "Detecting Anomalous Energy Consumptions in Distributed Manufacturing Systems"; 2012, URL:<https://ieeexplore.ieee.org/stamp/stamp.jsp?tp=&arnumber=6301142> (Year: 2012).*
(Continued)

*Primary Examiner* — Jonathan Michael Skrzycki
(74) *Attorney, Agent, or Firm* — Cozen O'Connor

(57) ABSTRACT

A device for identifying anomalies in an industrial system for implementing a production process for a product in which the industrial system includes a plurality of sensors for measuring process variables of the production process includes an anomaly detector having at least one trained artificial intelligence, wherein the artificial intelligence is configured and trained to detect and/or predict anomalies in the production process based on a plurality of measured data from the sensors, where the anomaly detector outputs anomaly information upon detecting and/or predicting an
(Continued)

anomaly, where in this case anomalies may be detected and predicted at the same time in multiple different performance indicators of the production process, and where the performance indicators each relate to the entire production process for the production of the product.

16 Claims, 8 Drawing Sheets

(58) Field of Classification Search
CPC ............ G05B 19/41875; G05B 23/024; G06N 20/00; Y02P 90/02
See application file for complete search history.

(56) References Cited

U.S. PATENT DOCUMENTS

| | | | | |
|---|---|---|---|---|
| 2017/0359418 | A1* | 12/2017 | Sustaeta | G05B 13/0285 |
| 2019/0180152 | A1 | 6/2019 | Krompaßet al. | |
| 2019/0286506 | A1* | 9/2019 | Cheng | G06F 11/0793 |
| 2021/0110262 | A1* | 4/2021 | Schmitt | G06N 3/045 |
| 2021/0334656 | A1* | 10/2021 | Sjögren | G06N 3/08 |
| 2022/0043431 | A1* | 2/2022 | Sayyarrodsari | G05B 19/41835 |
| 2023/0259585 | A1* | 8/2023 | Iskandar | G06F 18/251 706/16 |

FOREIGN PATENT DOCUMENTS

| | | |
|---|---|---|
| EP | 3098681 | 11/2016 |
| EP | 3693823 | 8/2020 |
| WO | 2019141593 | 7/2019 |

OTHER PUBLICATIONS

Benjamin Lindemann, "Anomaly detection and prediction in discrete manufacturing based on cooperative LSTM network", Aug. 2020, URL:<https://ieeexplore.ieee.org/stamp/stamp.jsp?tp=&arnumber=9216855> (Year: 2020).*
PCT International Preliminary Examination Report dated Dec. 8, 2022 based on PCT/EP2021/075610 filed Sep. 17, 2021.

* cited by examiner

DEVICE AND METHOD FOR IDENTIFYING ANOMALIES IN AN INDUSTRIAL SYSTEM FOR IMPLEMENTING A PRODUCTION PROCESS

CROSS-REFERENCE TO RELATED APPLICATIONS

This is a U.S. national stage of application No. PCT/EP2021/075610 filed 17 Sep. 2021. Priority is claimed on European Application No. 20199293.0 filed 30 Sep. 2020, the content of which is incorporated herein by reference in its entirety.

BACKGROUND OF THE INVENTION

1. Field of the Invention

The invention relates to an apparatus and method for identifying anomalies in an industrial plant for implementing a production process, where the plant comprises a plurality of sensors for measuring process variables of the production process.

2. Description of the Related Art

Industrial plants, such as plants in the process engineering industry or the discrete production industry, are frequently very complex systems with a plurality of operating modes, a large spatial extent and a collaboration between a plurality of components. As communication capabilities and the networking of the components, in particular of the sensors, increases, a plurality of data is created. This data makes it possible to identify anomalies (i.e., deviations from normal operating behavior) in the plant. However, very highly-qualified and specially trained personnel is necessary in order to continuously evaluate these anomalies and detect anomalies at the earliest possible stage. In many cases, overlooking an anomaly can lead to losses in value of the product (for example, through insufficient quality) or to damage in the plant.

With an increasing volume of data, the task of monitoring the operation of the plant becomes increasingly difficult, and an increasing number of personnel is needed for evaluation of the quantities of data. To support the personnel or even for automatic detection of anomalies, a wide variety of tools has already been developed. For example, WO 2019/141593 A1 discloses an apparatus for detecting anomalies in an actuator system (for example, a system of motors, pumps or conveyor belts). The apparatus comprises an anomaly detector with a trained artificial intelligence, which is designed and trained, based on a plurality of output data of the actuator system, to detect anomalies in the actuator system. Upon detection of an anomaly, an anomaly signal is output by the anomaly detector. The output data is created here, for example, with the aid of sensors, which are arranged in or on the actuators.

This enables defects or the threat of outages of the actuators to be identified and countermeasures (for example, repair, maintenance, and/or replacement) to be initiated at an early stage.

US 2015/0324329 A1 discloses a process modelling technique, which uses a single statistical model that has been developed from historical data for a typical process and uses this model to perform a quality prediction or an error detection for different process states of a process. Here, separate models are each used for the quality prediction or the error detection. To do this, the modelling technique determines average values (and possibly standard deviations) from process parameters for each of a set of product qualities, and/or throughputs and compares these with online process parameter measurements. Process analysis programs can be stored and can be capable of running in these cases in various devices of a process control system. With a central Process Monitoring and Quality Prediction System (PMS), an overall quality parameter for the overall production process or for a product resulting from the overall production process can be determined.

CN 107797537 A discloses an error prediction system for bearings for rotating components of an automated production line. In this publication, on the basis of measured data from sensors, with the aid of a deep learning neural network model, there is a real-time monitoring of the bearings. The error prediction is thus restricted just to the bearings of the production line.

EP 3 693 823 A1 discloses a method for identifying an error, in which a plurality of time series sensor data items are received, which are obtained from a production process of an electronic device. The time series sensor data is arranged in a two-dimensional (2D) data field. With the use of a neural network, a pattern is identified in the 2D data field, which corresponds to an error state. An error indicator for the error state is provided in the production process of the electronic device and, based on the basis the error indicator, it is determined whether the electronic device has an error.

EP 3 098 681 A1 discloses a system and method for "health" management of a host system, which is based on artificial intelligence. A neural network is configured such that it monitors a plurality of patterns, which represent responses of system parameters of the host system and are created in real time. The patterns are compared with predefined patterns to identify one or more potential anomalies in the host system or in subsystems.

U.S. Pat. No. 5,877,954 A discloses a hybrid analysis facility comprising a primary trained model derived from data (for example, a linear model such as a Partial Least Squares model) for predicting output variables of an industrial process and an error correction model (for example, a non-linear model such as a neural network) for error correction of the output values of the primary model.

SUMMARY OF THE INVENTION

Using the foregoing as a starting point, it is therefore an object of the present invention to provide an apparatus and method that improve even further the detection of anomalies in complex industrial plants. In particular, an optimum operation of the overall plant from different points of view is made possible and management personnel of the plant are supported in making necessary operational decisions.

These and other objects and advantages are achieved in accordance with the invention by an apparatus, and method, a method for providing trained artificial intelligence and by computer programs where the inventive apparatus serves to identify anomalies in an industrial plant for implementing a production process for a product, and where the plant comprises a plurality of sensors for measuring process variables of the production process. The apparatus comprises an anomaly detector with at least one trained artificial intelligence, which is configured and trained, based on a plurality of measured data of the sensors, to detect and/or predict anomalies in the production process. The detector is configured, on detection and/or prediction of an anomaly, to specify an item of anomaly information.

Preferably, the anomaly information also comprises a period of time in which the anomaly has occurred, and/or a probability of the presence of the anomaly.

The anomaly detector is inventively configured in this case to detect and predict anomalies at the same time for a number of different performance indicators of the production process, where the performance indicators each relate to the overall production process of the product. In other words, the performance indicators relate to the overall production process of an (end) product resulting therefrom.

The artificial intelligence is established and trained in this case both to detect and also to predict anomalies, i.e., a common data model is used, for example, both for detection and also for prediction of anomalies.

The invention is based on the knowledge that, during operation of the plant, the operational and business objectives of the plant operator can change, for example, depending on the market situation. This also has an effect on the operation of the plant. At a specific point in time, it is therefore important to detect and/or predict just those anomalies in the production process that have the greatest influence on the current operational and business objectives obtaining in each case. Such operational and business objectives, as a rule, relate to the overall production process. Accordingly, the performance indicators obtained from the sensor data must also relate to the overall production process.

The term "performance indicator" is understood in this case as a characteristic value with the aid of which a degree of fulfilment in respect of a specific set objective (for example, of an operational or business objective) regarding the production process can be measured. Preferably, a performance indicator involves a physically measurable variable, such as a purity or a dimensional accuracy of a product, a number of units, a volume, and/or an amount. Thus, preferably one of the measured process variables or a variable derived therefrom (for example, an average value of a process variable) is used as a performance indicator.

The term "production process" is understood here not only as a fabrication or manufacturing process, but also as a machining, processing or conversion process (for example also an energy generation process).

The measured data can involve data about process variables that is based directly on measured values. It can, however, also involve data about process variables that have been derived from measured values of other process variables.

Examples of operational or business objectives are:

maximum capacity,
minimum costs,
maximum sales profit per unit of the product,
maximum environmental friendliness,
maximum product quality,
minimum energy costs,
maximum yields of the materials used,
maximum product quantity.

Possible performance indicators resulting therefrom are:

quality of a produced product (for example, purity of a produced material),
quantity of a produced product per unit of time (throughput),
energy consumption,
water consumption,
raw material consumption,
emissions,
a relationship or relationships between at least two of the aforementioned performance indicators.

With the aid of artificial intelligence, complex data correlation and thus complex process interrelationships can be established and thus anomalies detected. The artificial intelligence can in such cases have been trained by an algorithm from the area of machine learning or with the aid of rule-based or mathematical (for example, statistical) methods. Examples of such algorithms or methods are neural networks, autoencoder, Gaussian mixture model, boosted Gaussian mixture ensemble and isolation forest, as well as combinations of all of these methods.

The invention thus makes it possible to define various different performance indicators which, for example, represent different operational or business objectives, and then to monitor them selectively and, depending on objective, explicitly for anomalies that have the same influence on the achievement of this objective.

The invention can thus be applied to plants in which a number of different production processes are being performed at the same time. With the invention, anomalies in performance indicators of the different production processes can then also be detected and predicted.

The invention in such cases can function as a type of anomaly assistant accompanying the operation of the plant. Measures can be suggested to the plant operator depending on the type and duration of an anomaly. Management personnel of the plant can thus be supported in making the necessary operational decisions. The suggested measures can thus be automated in the open-loop and/or closed-loop control of the plant or be included in the respective production process. The operational or business objectives can thus be converted directly into measures for an optimum open-loop and/or closed-loop control of the respective production process or generally of the plant as a whole. The plant or the respective production process is brought into alignment by this with the operational or business objectives of the plant.

In an especially easy-to-realize embodiment, the anomaly detector can have a separate anomaly detector unit in each case for each of the performance indicators.

Each of the anomaly detector units can comprise a separate trained artificial intelligence in each case, which is configured and trained to detect and to predict anomalies in the production process.

In accordance with one preferred embodiment, the anomaly detector is configured, for a detected and/or predicted anomaly, to determine a relevance of the anomaly with regard to at least one, especially to a number, of different operational or business objectives of the production process. The anomalies or countermeasures for these can then be prioritized based on their relevance by operating personnel of the production process very easily and quickly.

The relevance can be determined especially easily by a weighting of the performance indicators (for example, throughput, quality) as a function of the at least one, in particular of the number, of different operational or business objectives.

The relevance can then be visualized especially easily to the plant operator by a classification of the anomalies into different message classes (for example, simple message, warning, alarm). If for example, for a specific operational or business objective, the quality of the end product is more important than the throughput, then an anomaly in throughput would only lead to a warning, but an anomaly in quality would lead to an alarm.

For determination of current operational or business objectives, obtaining for the production processes the anomaly detector preferably comprises means for determining selection information about at least one current operational or business objective of the production process.

In accordance with a further preferred embodiment, the apparatus comprises a configuration facility, which is configured to configure the anomaly detector, in particular the artificial intelligence, as a function of at least one operational or business objective of the production process. The anomaly detector can then be better adapted to the respective task. For example, a specifically adapted selection of measured data or a specific combination of data analysis algorithms can be set, which ensures an especially good quality of anomaly detection for the various performance indicators.

Preferably, the anomaly detector has a jointly trained artificial intelligence for all of the number of performance indicators. In other words, a jointly trained artificial intelligence is used for the simultaneous detection and prediction of anomalies for the number of performance indicators.

The anomaly detector is advantageously configured in this case such that it uses a number of algorithms, which interact with one another simultaneously. As a rule, this enables better results to be achieved in the detection of anomalies.

For example, the anomaly detector can use a number of simultaneously collaborating algorithms (for example, an ensemble of neural networks or a boosted ensemble). It can, however, also use a number of simultaneously collaborating different algorithms (for example, multi-stage systems with autoencoders, random forests and convolutional neural networks), which work together.

The anomaly detector is advantageously configured in this case as a multi-stage system with a number of data analysis and processing stages arranged after one another.

In accordance with a further very advantageous embodiment, the artificial intelligence is configured and trained, for the detection and/or prediction of the anomalies, to take account of a temporal sequence of the measured data and/or temporal relationships between the measured data. In other words, a time series analysis is undertaken by the artificial intelligence. Thus, changes in time series of measured data can be identified and future time series performance indicators predicted. As it has turned out, this enables a high robustness and a high accuracy of the anomaly detection to be achieved (i.e., fewer false positives). The measured data here can involve current and historical measured data.

Advantageously the artificial intelligence is trained on a normal state of the production process or of the performance indicators. To this end, "bad states" are removed from the training data. The artificial intelligence thus looks for abnormalities in the performance indicators, which stand out from the trained normal state. This also makes a very wide application of the anomaly detection possible with only very little historical anomaly data.

In accordance with a further advantageous embodiment, the artificial intelligence is trained at least in part with simulated measured data from sensors. The simulated measured data, for example, can be created by a simulator (or a digital twin) for the production process. The simulator (digital twin) can be based, for example, on physical/chemical models of the production process.

This enables a fast initial training of the artificial intelligence to be undertaken in the anomaly detector. Then, with the aid of the simulated measured data and the real measured data, the artificial intelligence can subsequently be continuously improved, in particular for a scale-up of production from laboratory scale through to a very much larger scale production plant. Thus, a digital triplet consisting of anomaly detector, simulation (digital twin) and process data (measured sensor data) focused on anomalies is produced, however not just from a technical perspective, but also from a perspective of the operational or business objectives of the plant.

Preferably, the anomaly detector is configured in such that it performs a validation of the anomaly detection and/or prediction with the aid of deviations between the (real) measured data of the sensors and simulated measured data of the sensors.

The anomaly detector can thus use deviations between the results of the simulation (or of the digital twin) and the real process data (measured sensor data) for improving the accuracy of the anomaly detection and prediction. These deviations can likewise be supplied to the anomaly detector as time series data or can be created by the latter. Thus, a faster implementation and a faster, more reliable use of the anomaly detector is possible.

While any abnormalities, which are detected by the simulator (or digital twin), are usually resolved with the aid of engineering measures after technical/commercial discussions, the anomaly detector can act directly with the operator of the plant and assist them in real time in decisions about suitable countermeasures for detected abnormalities. In particular, by contrast with the simulator (or digital twin), the anomaly detector is not required to focus on each individual abnormality. Instead, the anomaly detector can act as a filter and only pass on such anomalies as have a perceptible influence on operational or business objectives of the plant operator. This makes it possible for the plant operator to initiate immediate countermeasures for reducing the influence of the anomaly on the production process.

In accordance with a further advantageous embodiment, the performance indicators are at least two different indicators from the group of:

- quality of a produced product,
- quantity of a produced product per unit of time (throughput),
- energy consumption,
- water consumption,
- raw materials consumption,
- emissions,
- a relationship or relationships between at least two of the aforementioned performance indicators.

Preferably, the at least two different performance indicators comprise at least the quality of the produced product and the quantity of a produced product per unit of time (throughput).

The objects of the invention are also achieved by a method for identification of anomalies in an industrial plant for carrying out a production processes for a product, where the plant comprises a plurality of sensors for measurement of process variables of the production process, and where the method comprises:

a) receiving a plurality of measured data of the sensors, b) detecting and/or predicting anomalies in the production process based on the plurality of measured data while using at least one trained artificial intelligence, c) outputting anomaly information upon detection and/or prediction of an anomaly, where during step b), anomalies are detected and predicted simultaneously for a number of different performance indicators of the production process, and where the performance indicators each relate to the overall production process for the production of the product.

Preferably, for a detected and/or predicted anomaly, there is a relevance of the anomaly with regard to at least one, especially to a number of different, operational or business objective(s) of the production process.

In accordance with a further advantageous embodiment, the method, in particular the artificial intelligence, is configured as a function of at least one operational or business objective of the production process. A separate trained artificial intelligence can be used here for each of the performance indicators.

Preferably, a common trained artificial intelligence is used for all of the performance indicators.

A number of algorithms, which interact with each other at the same time, can be used for the detection and/or prediction of the anomalies.

The artificial intelligence is preferably configured and trained, upon detection and/or prediction of the anomalies, to take into account a temporal sequence of the measured data and/or temporal relationships between this measured data.

Advantageously the artificial intelligence is trained with the aid of normal states of the production process.

Furthermore, the artificial intelligence is advantageously trained at least in part with simulated measured data from sensors. Here, there can also be a validation of the anomaly detection and/or prediction with the aid of deviations between the measured data of the sensors and simulated measured data of the sensors.

In accordance with a further advantageous embodiment, the performance indicators are at least two different indicators from the group of:

- quality of a produced product,
- quantity of a produced product per unit of time (throughput),
- energy consumption,
- water consumption,
- raw materials consumption,
- emissions,
- a relationship or relationships between at least two of the aforementioned performance indicators.

The effects and advantages stated for the inventive apparatus and its advantageous embodiments apply correspondingly to the inventive method and its advantageous embodiments.

The objects and advantages are further achieved by a method for providing a trained artificial intelligence for identification of anomalies in an industrial plant for carrying out a production process for a product, where the plant comprises a plurality of sensors for measurement of process variables of the production process, and where the method comprises:

- receiving input training data, which represents measured data of the sensors,
- receiving output training data, which represents anomalies in the measured data, where the output training data comprises assignments to at least one of a number of different performance indicators of the production process, and where the performance indicators each relate to the overall production process for the production of the product,
- training the artificial intelligence based on the input training data and the output training data such that these anomalies are detected and predicted at the same time for a number of different performance indicators in the production process, and
- providing the trained artificial intelligence.

A first inventive computer program (or computer program product) comprises instructions that, when the program is executed on a computer, cause the computer to implement the method for identification of anomalies in accordance with the disclosed embodiments.

A second inventive computer program (or computer program product) comprises instructions that, when the program is executed on a computer, cause the computer to implement the method for provision of a trained artificial intelligence in accordance with the disclosed embodiments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, as well as further advantageous embodiments of the invention are explained in greater detail below with the aid of exemplary embodiments in the figures, in which.

DETAILED DESCRIPTION OF THE EXEMPLARY EMBODIMENTS

Figure 1:
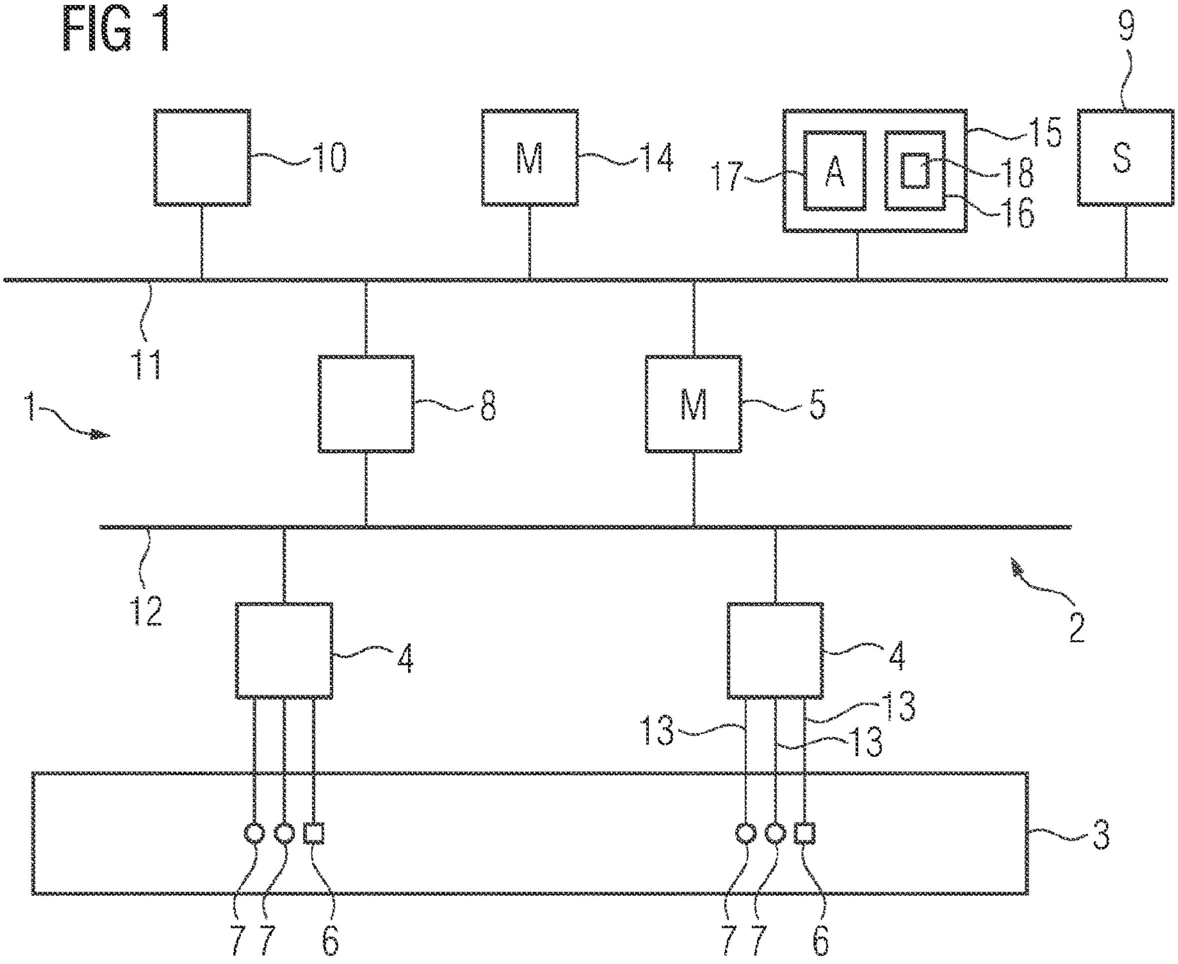
FIG. 1 shows an exemplary basic structure of an industrial plant with a local arrangement of an inventive apparatus.

In the figures parts that correspond to one another are labeled in each case with the same reference characters.

FIG. 1 shows, in a simplified and exemplary diagram, an industrial plant 1 with an automation system 2 for open-loop and/or closed-loop control of a production process 3. The term "production process" is understood here not only as a production or manufacturing process, but also as a working, processing or conversion process (for example, also an energy generation process).

Such plants 1 are used in a very wide variety of industry sectors, for example, in the process industry (for example, paper, chemicals, pharma, metal, oil and gas), the discrete production industry and in energy generation. The automation system 2 comprises, for example, a number of industrial controllers 4, an automation server 5 and an engineering server 8.

Each of the controllers 4 controls the operation of one respective subarea of the process 3 as a function of its operating states. To this end, the process 3 comprises actuators 6 able to be controlled by the controllers. This can involve individual actuators (for example, a motor, a pump, a valve, or a switch), groups of such actuators or entire sections of a plant. Furthermore the process comprises sensors 7, which make available to the controllers 4 measured values of process variables (for example, temperatures, pressures, fill levels, and/or throughflows).

A communications network of the plant 1 comprises at a superordinate level a plant network 11, via which the servers 5, 8 are in communication with a Human-Machine Interface (HMI) 10, and a controller network 12, via which the controllers 4 are in communication with the servers 5, 8. The connection between the controllers 4 and the actuators 6 and sensors 7 can be made via discrete signal lines 13 or via a field bus.

The Human-Machine Interface (HMI) 10 is usually configured as an operation and monitoring station and is arranged in a control center of the plant 1.

The automation server 5 can, for example, involve what is known as an operator system server or application server, in which one or more plant-specific application programs are stored and executed during the operation of the plant 1. These, for example, serve to configure the controllers 4 in of the plant 1, to detect and implement operator activities at the Human-Machine Interface (HMI) 10 (for example, to set or change required values of process variables) or to create messages for plant personnel and have them displayed at the Human-Machine Interface (HMI) 10.

The automation system 2 without the field devices (i.e., without actuators 6 and sensors 7) is frequently also referred to as the process control system.

In large industrial plants, a plurality of the above-described components are used. Sometimes, a number of production processes 3 can also be implemented at the same time. The sensors 7 therefore make available a plurality of measured data M from process variables of the process 3. This measured data M is stored on a process data archive server 14 together with messages of the automation server 5 and also additional information (e.g., lot data, status information of intelligent field devices).

Furthermore, an inventive apparatus 15 for identification of anomalies in the plant 1 is present. This comprises an anomaly detector 16 with a trained artificial intelligence 18, which is configured and trained to detect and to predict anomalies in the production process 3 based on a plurality of the measured data M. Upon detection and/or prediction of an anomaly, anomaly information A is output at a (preferably graphical) user interface 17. The anomaly information A in this case also preferably comprises information about a probability of the presence of an anomaly and information about a period of time in which the anomaly is occurring.

The anomaly detector 16 is configured to detect and to predict anomalies for a number of different performance indicators of the production process 3, where the performance indicators each relate to the overall production process 3. Examples of performance indicators are:

- quality of a produced product,
- quantity of a produced product per unit of time (throughput),
- energy consumption,
- water consumption,
- raw materials consumption,
- emissions, and
- a relationship or relationships between at least two of the aforementioned performance indicators.

The apparatus 15 is connected to the plant network 11 and via the network accesses current and historical measured data M (as well as where necessary additional data of the automation system 2), which is provided by the process data archive server 14 and the server 5.

The automation system furthermore comprises a simulator (or digital twin) 9 for the production process 3. The simulator 9 simulates the production process 3, for example, based on physical and/or chemical models. The simulator 9 is likewise connected to the plant network 11. The apparatus 15 can access simulation data S of the simulator 9 or can receive it from the simulator 9 via the network.

Figure 2:
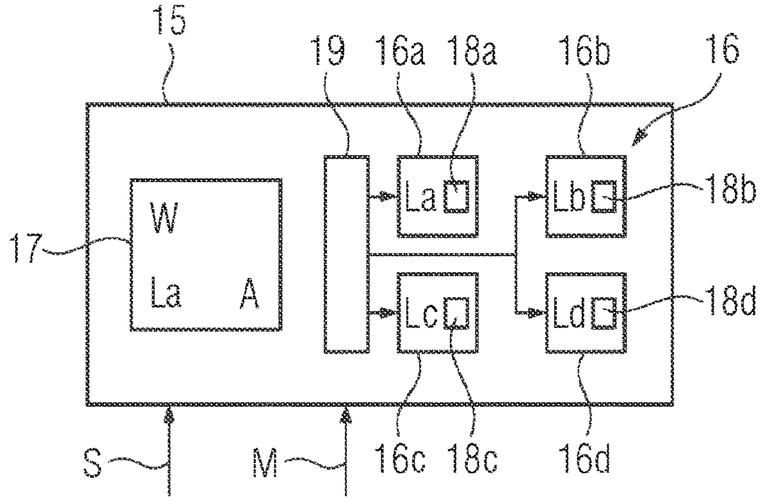
FIG. 2 shows a first exemplary embodiment of an anomaly detector in accordance with the invention.

As shown more precisely in FIG. 2, the anomaly detector 16 can have a separate anomaly detector unit 16*a*, 16*b*, 16*c*, 16*d* for each different performance indicator La, Lb, Lc, Ld in each case. Each of the anomaly detector units 16*a*, 16*b*, 16*c*, 16*d* in this case comprises a separate trained artificial intelligence 18*a*, 18*b*, 18*c*, 18*d* in each case, which is configured and trained to detect and to predict the anomalies in the production process 3 for the respective performance indicator La, Lb, Lc, Ld.

The apparatus 15 is configured to provide the plant personnel, in particular its management level, with the different performance indicators La, Lb, Lc, Ld for selection via the user interface 17 and to detect a subsequent input of selection information W about a selection of one of the performance indicators La, Lb, Lc, Ld, here for example of the performance indicator La.

Then, as a function of the detected selection information W, the apparatus 15 activates the anomaly detector unit 16*a*, 16*b*, 16*c*, 16*d* assigned to the selected performance indicator La, Lb, Lc, Ld, here the anomaly detector unit 16*a*, and displays the performance indicator L and the anomaly information A at the user interface 17.

The anomaly detector units 16*a*, 16*b*, 16*c*, 16*d* are furthermore configured to autonomously select from the plurality of historical and current measured data M the measured data M needed for the respective operation and to process it.

Figure 3:
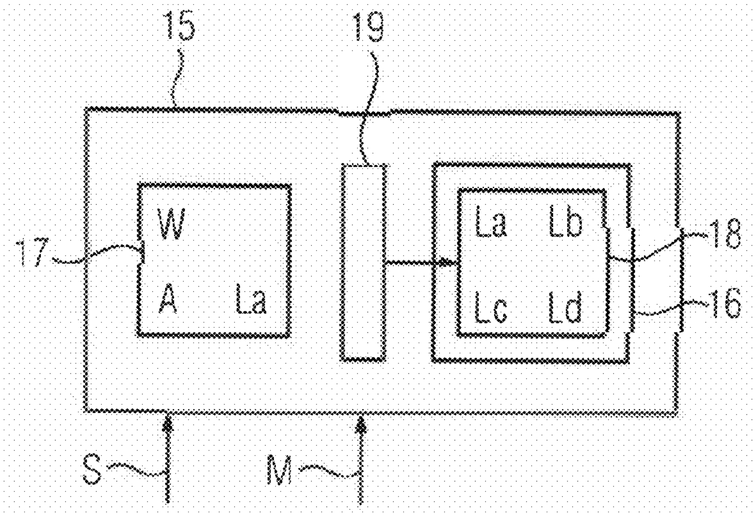
FIG. 3 shows a second exemplary embodiment of an anomaly detector in accordance with the invention.

The anomaly detector 16 or its trained artificial intelligence 18 can however also (as shown in FIG. 3) be configured to detect and to predict anomalies of the number of different performance indicators La, Lb, Lc, Ld at the same time. Then, however, as a function of the selection information W, only the selected performance indicator in each case, here for example the performance indicator La, with the associated anomaly information A, is displayed at the user interface 17.

The apparatus 15 is furthermore configured to provide the plant personnel, in particular its management level, via the user interface 17 with different operational or business objectives Z for selection and to detect a subsequent input of selection information Y via a selection of one or more of the operational or business objectives Z.

The apparatus 15 furthermore comprises a configuration facility 19, which is configured to configure the anomaly detector 16, in particular the artificial intelligence 18 or 18*a*, 18*b*, 18*c*, 18*d*, as a function of at least one operational or business objective of the production process. The anomaly detector 16 can then be better adapted to the respective task. For example, a specifically adapted selection of measured data or a specific combination of data analysis algorithms can be set by this, which ensures an especially good quality of the anomaly detection for the various performance indicators with high relevance for a selected operational or business objective.

Figure 4:
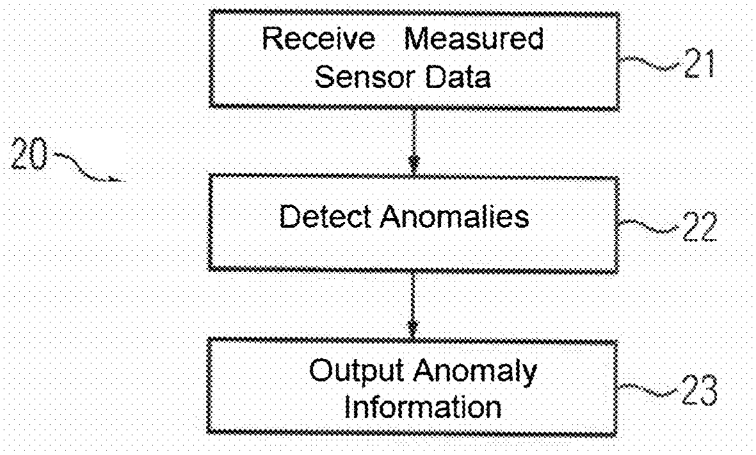
FIG. 4 shows an inventive execution sequence of a method for identification of anomalies in accordance with the invention.

FIG. 4 shows, in a simplified diagram, an inventive execution sequence of method 20 in the anomaly detector 16 from FIG. 1. In a first step 21, a plurality of current and historical measured data M of the sensors 7 is received. In a second step 22, while using the artificial intelligence 18, anomalies in the production process 3 are detected and predicted based on the plurality of measured data M. The anomalies can in this case be detected and predicted at the same time for a number of different performance indicators La, Lb, Lc, Ld of the production process 3, where the performance indicators La, Lb, Lc, Ld each relate to the overall production process 3 for a product, i.e., an (end) product resulting from the production process. In a third step 23, upon detection and/or prediction of an anomaly, anomaly information A is output at the user interface 17.

Preferably, the current and historical measured data M is available as a time series of measured data and, upon detection and prediction of the anomalies by the artificial intelligence 18, a temporal sequence of the measured data (current and historical measured data) or temporal relationships between this measured data are taken into account. In other words, a time series analysis is undertaken by the artificial intelligence. Thus, changes in the time series of measured data can be detected and future time series of performance indicators predicted.

In the case of FIG. 1, the apparatus 15 for identification of anomalies is installed directly on site in the plant 1 (on-premise). As an alternative, as shown in FIG. 5, the apparatus 15 for identification of anomalies can also be installed remote from the plant in a distributed computer system (cloud).

Figure 5:
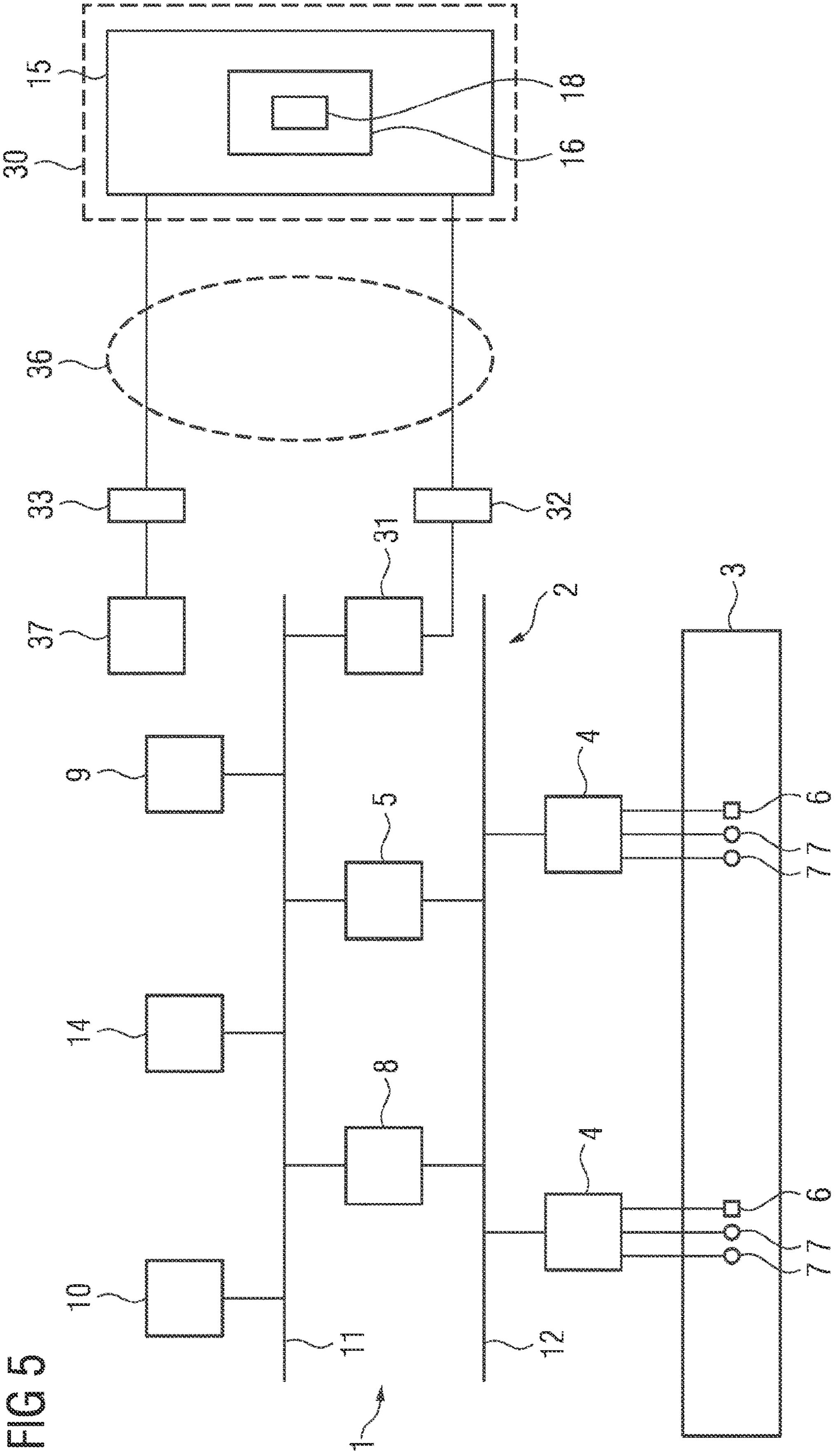
FIG. 5 shows an exemplary basic structure of an industrial plant with a cloud-based arrangement of an inventive apparatus.

To this end, FIG. 5 shows the plant 1 already shown in FIG. 1 with the automation system 2 and the production process 3. Unlike in FIG. 1, however, the apparatus 15 for anomaly identification is installed in a cloud 30. The apparatus receives the measured data M and where necessary simulation data S of the simulator 9 via a connection server 31 of the automation system 2 and a public communication network 36, such as the Internet. The performance indicators and the created anomaly information are once more output via a user interface 37, which is located in the plant 1, to personnel of the plant 1. The information output at the user interface 37 is likewise received via the communication network 36 from the apparatus 15.

There can still be firewalls 32, 33 arranged between the connection server 31 and the apparatus 15 and also between the apparatus 15 and the user interface 37.

As an alternative, the simulator 9 can likewise be installed in the cloud 30 instead of in the plant 1.

Figure 6:
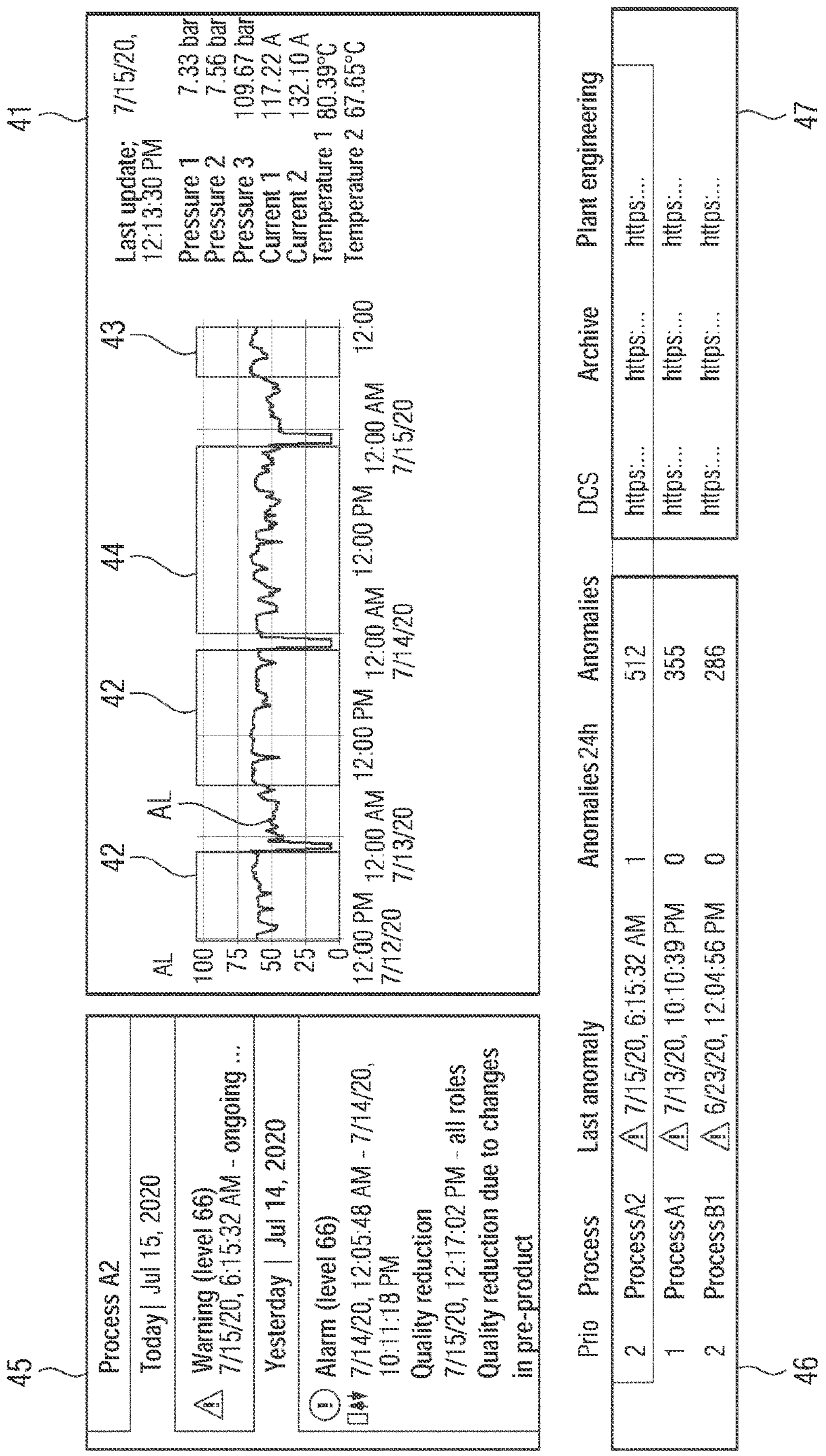
FIG. 6 shows an exemplary output of anomalies for a performance indicator at a graphical user interface in accordance with the invention.

FIG. 6 shows a diagram of a performance indicator and associated anomaly information, by way of example, as can be displayed at the graphical user interfaces 17, 37.

In an area 41 over the course of time for a performance indicator, here for example the quality of a product created, a probability AL (AL=Anomaly Level) of an anomaly is shown. 42 in this case designates time areas in which an anomaly is present with only relatively low probability. 43 designates a time area in which an anomaly is already present with higher probability and therefore a warning has been generated. 44 designates a time area in which an anomaly is present with comparatively high probability. Therefore, an alarm message has been generated. Furthermore, in the area 41 measured data from a few sensors is also output, such as pressures (Pressure 1, Pressure 2, Pressure 3), electrical currents (Current 1, Current 2) and temperatures (Temperature 1, Temperature 2).

In an area 45, the most recent alarms (Alarm (level 66)) and warnings (Warning (level 66)) of all monitored production processes or of a selected production process (here process A2) are output. In conjunction with the alarm, the monitored performance indicator (here the quality), the effect of the anomaly (here a reduction in quality) as well as a cause (here quality reduction due to change in immediate product) are also output.

In an area 46, the production process with the most recent detected or predicted anomalies at the topmost position of a list of the production processes (here process A2, process A1, process B1) together with respective information about the last anomaly, the number of the anomalies in the last 24 hours and the overall number of anomalies is output.

In an area 47, additional information about the selected production process, such as from the process control system, is incorporated with the aid of links.

Figure 7:
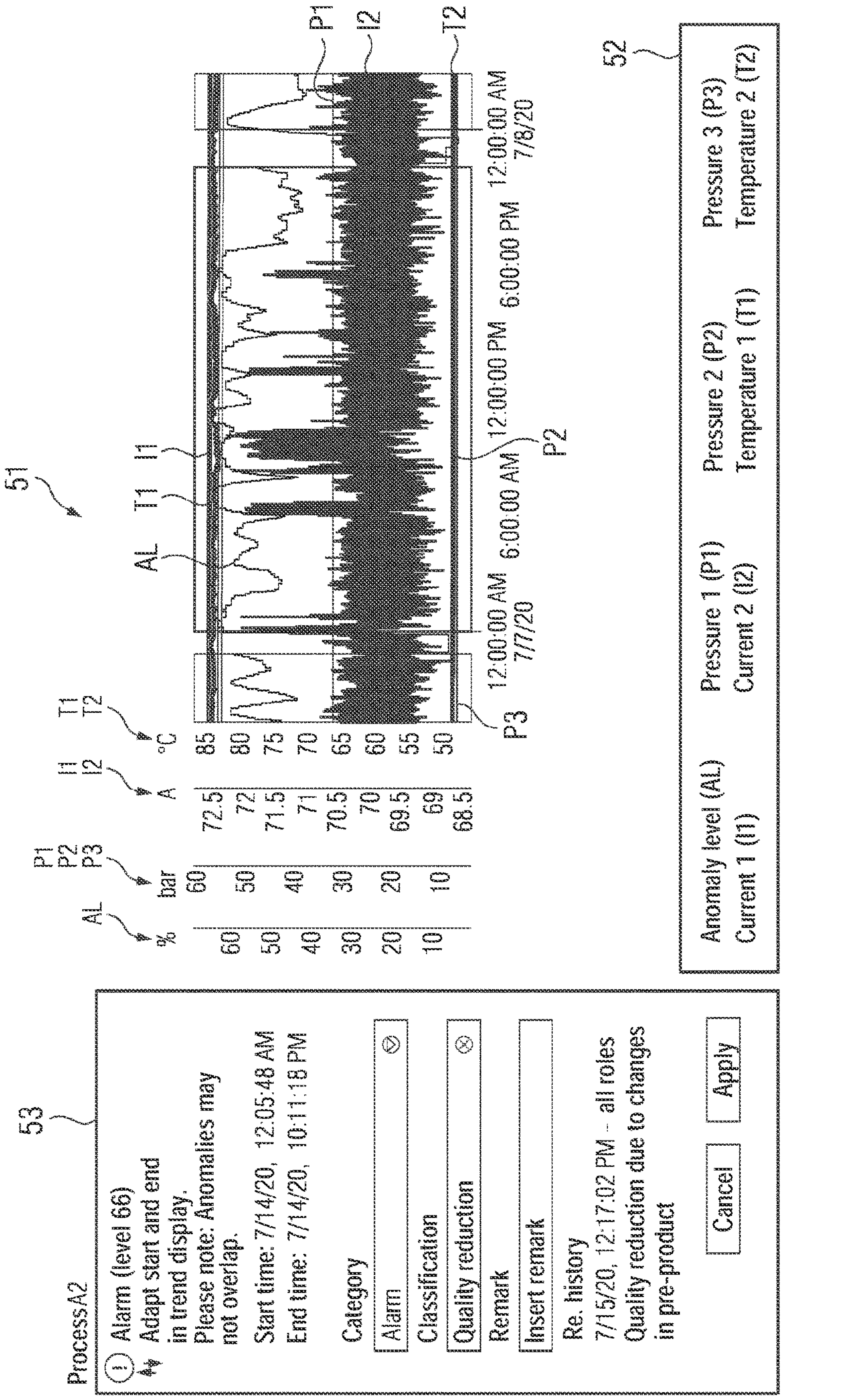
FIG. 7 shows an exemplary detailed view of an anomaly at a graphical user interface.

FIG. 7 shows, by way of example, an output of detailed information about the temporal course of the probability AL for an anomaly of the selected performance indicator. Here, in an area 51, in addition to the anomaly probability AL, temporal courses of measurement over time are also output, for which in an area 52 a key is output.

In an area 53, a rating of the alarm, a classification or effect with regard to the performance indicator (classification) and a cause analysis (Note) are output.

Figure 8:
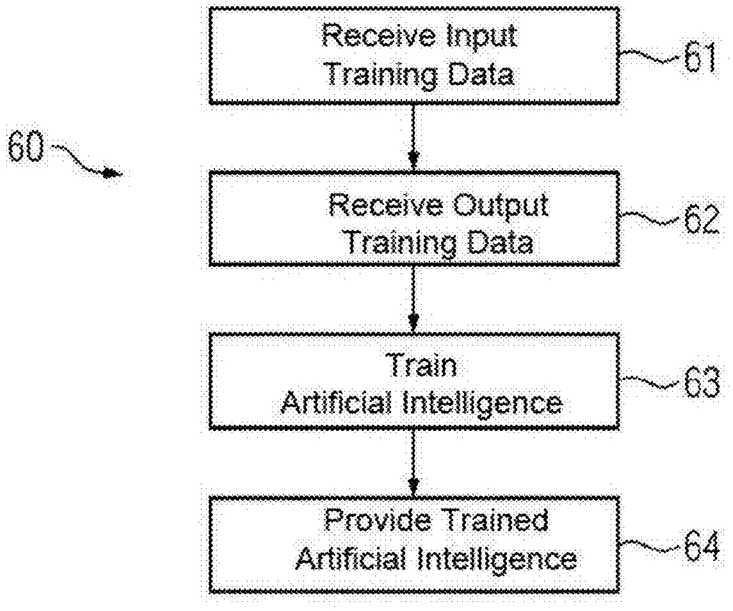
FIG. 8 shows an exemplary execution sequence of a method for providing a trained artificial intelligence for identification of anomalies in accordance with the invention.

FIG. 8 shows in a simplified diagram an inventive execution sequence of the method 60 for providing a trained artificial intelligence for identification of anomalies in the plant 1 of FIG. 1 or FIG. 5.

In a first step 61, input training data, which represents historical measured data M of the sensors 7, is received. Preferably, this involves time series of measured data.

In a second step 62, output training data, which represents anomalies in the historical measured data M, is received, where the output training data comprises assignments to at least one of a number of different performance indicators La, Lb, Lc, Ld of the production process 3. The performance indicators La, Lb, Lc, Ld each relate to the overall production process 3.

In a third step 63, the artificial intelligence is trained based on the input training data and the output training data such that these anomalies are detected and predicted at the same time for a number of different performance indicators in the production process 3. The artificial intelligence can in this case be trained by an algorithm from the field of machine learning or with the aid of rule-based or mathematical (for example, statistical) methods. Especially advantageous algorithms or methods are neural networks, autoencoders, Gaussian mixture model, boosted Gaussian mixture ensemble and isolation forest, as well as combinations of all these methods. Backpropagation with gradient-based optimization can be used as a training method in the case of neural networks, for example.

Preferably, the artificial intelligence is configured and trained upon detection and prediction of the anomalies, to take into account a temporal sequence of the measured data (current and historical measured data) or temporal relationships between the measured data. In other words, a time series analysis is undertaken by the artificial intelligence. Thus, changes in the time series of measured data can be identified and future time series of performance indicators predicted. For example, correlations between all current and historical measured values of all sensors are determined.

Furthermore the artificial intelligence is preferably trained on a normal state of the production process or of the performance indicators. To this end, "bad states" are removed from the training data. The artificial intelligence thus looks for abnormalities in the performance indicators that stand out from the trained normal state.

In a fourth step 64, the trained artificial intelligence is provided.

Figure 9:
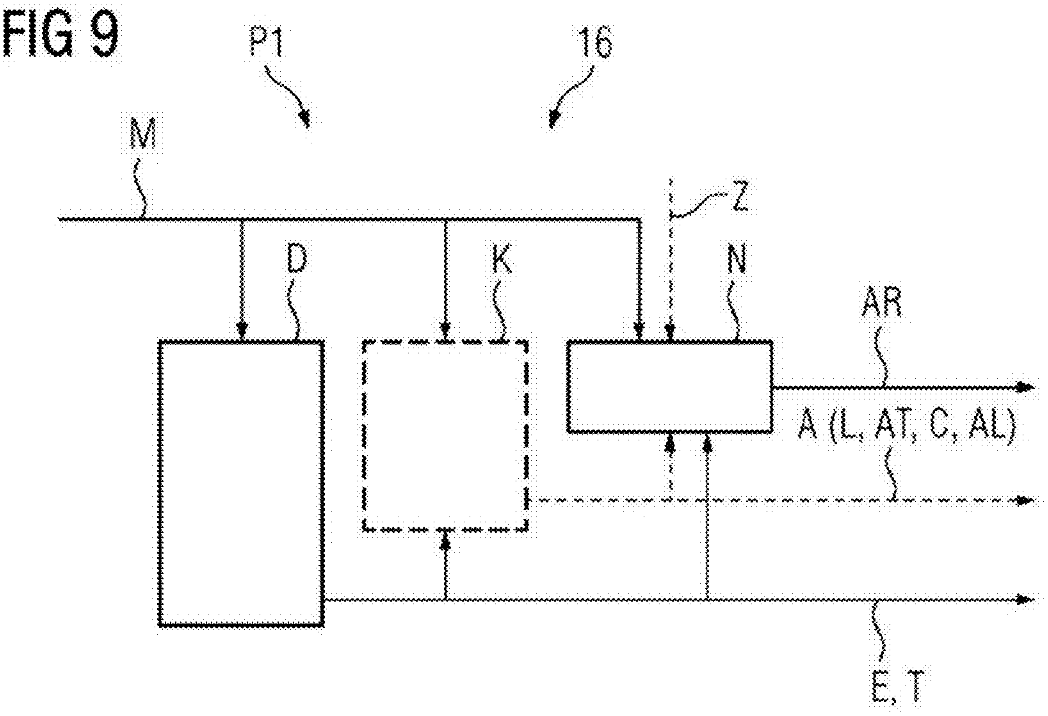
FIG. 9 shows a first exemplary embodiment of a data pipeline in an inventive anomaly detector.

FIG. 9 shows, in a simplified diagram for the anomaly detector 16 of FIG. 3, an example of a data pipeline P1, i.e., various data analysis and/or processing elements arranged after one another, where a subsequent data analysis and/or processing element processes results of at least one previous data analysis and/or processing element. Optional components and data flows are shown in this figure with dashed lines.

The anomaly detector 16 or the data pipeline P1 is structured in multiple stages and comprises three stages connected after one another, detection (D), classification (K) and Postprocessing (N), which each receive measured data M of the process variables (current and historical) in the form of time series.

In the detection stage D, with the aid of artificial intelligence, estimated normal values E (i.e., normal values without the presence of an anomaly) for a number of different performance indicators (for example, quality, throughput) as well as times T of deviations of the performance indicators from normal values are determined from the received measured data M and output. In other words, abnormalities in the measured data or in its correlations are sought, which stand out from the trained normal state.

The artificial intelligence preferably works in this case with the aid of unsupervised learning (but supervised and semi-supervised learning is also possible).

As has become apparent, especially good results can be obtained for measured data of sensors in industrial production plants with the boosted Gaussian mixture ensemble method. In this method, the history can also be taken into account, for example, with the aid of Long Short-Term Memory (LSTM) neural networks.

In the classification stage K, with the aid of artificial intelligence, from the received measured data M and the received estimated normal values E of the performance indicators (for example, quality, throughput) as well lengths of time T of deviations from the normal values, there is an assignment (classification) to known trained anomaly types. Anomaly information A is created, which comprises the performance indicator L (for example, quality, throughput) concerned, the type AT of the anomaly (for example, quality reduction, throughput reduction), a possible cause C for the anomaly and a probability AL of the presence of the anomaly.

The artificial intelligence in the stage K can work in this case with supervised or rule-based methods. Preferably neural networks are used.

In the postprocessing stage N finally an anomaly relevance AR (i.e., a relevance of an anomaly determined) is determined with regard to one or a number of operational or business objectives Z of the plant 1.

To this end, the post-processing stage N receives from the stage D normal values E of the performance indicators L determined (for example, quality, throughput) as well as times T of deviations of the performance indicators L from the normal values as input variables. Furthermore, the stage N receives as input variable the anomaly information A created by the stage K.

Moreover, in the stage N, information about current operational or business objectives Z of the plant 1 is available. This information can already be stored permanently in the stage N or can (as has been explained in conjunction with FIGS. 1-3) be acquired via the user interface 17 or received from outside in another way. The information can be available, for example, in the form of weightings for the different performance indicators L with regard to different operational or business objectives Z of the plant.

Depending on weighting, corresponding scores for the meaning of anomalies determined with respect to the achievement of the operational or business objectives are determined by the stage N and output as relevance AR of the respective anomaly for the operational or business objective or objectives Z.

It is thus evident to the operator of the plant what relevance an anomaly has with regard to each of their operational or business objectives Z and they can accordingly initiate suitable measures for prioritization of their operational or business objectives Z. For example, they can immediately initiate countermeasures for rectification of anomalies with relevance for high-priority operational or business objectives Z and postpone for the time being countermeasures for rectification of anomalies with relevance for low-priority operational or business objectives Z.

Especially advantageously, the stage N realizes a post-processing for improving the quality of the anomaly identification. For this post-processing, for example, anomalies that have been determined with other methods (e.g., characteristic field methods or rule-based methods) or originate from a classical model (hybrid) can be included. This means that there is a validation of anomalies with anomalies determined in other ways. The option also exists of using the measured data to enhance the quality of the anomaly identification. In this way, for example, a specific behavior of the measured values can be employed for validation of the anomalies. The post-processing can be undertaken by any form of filtering, if necessary, also again with an AI but also for example by rules with regard to the measured values.

Figure 10:
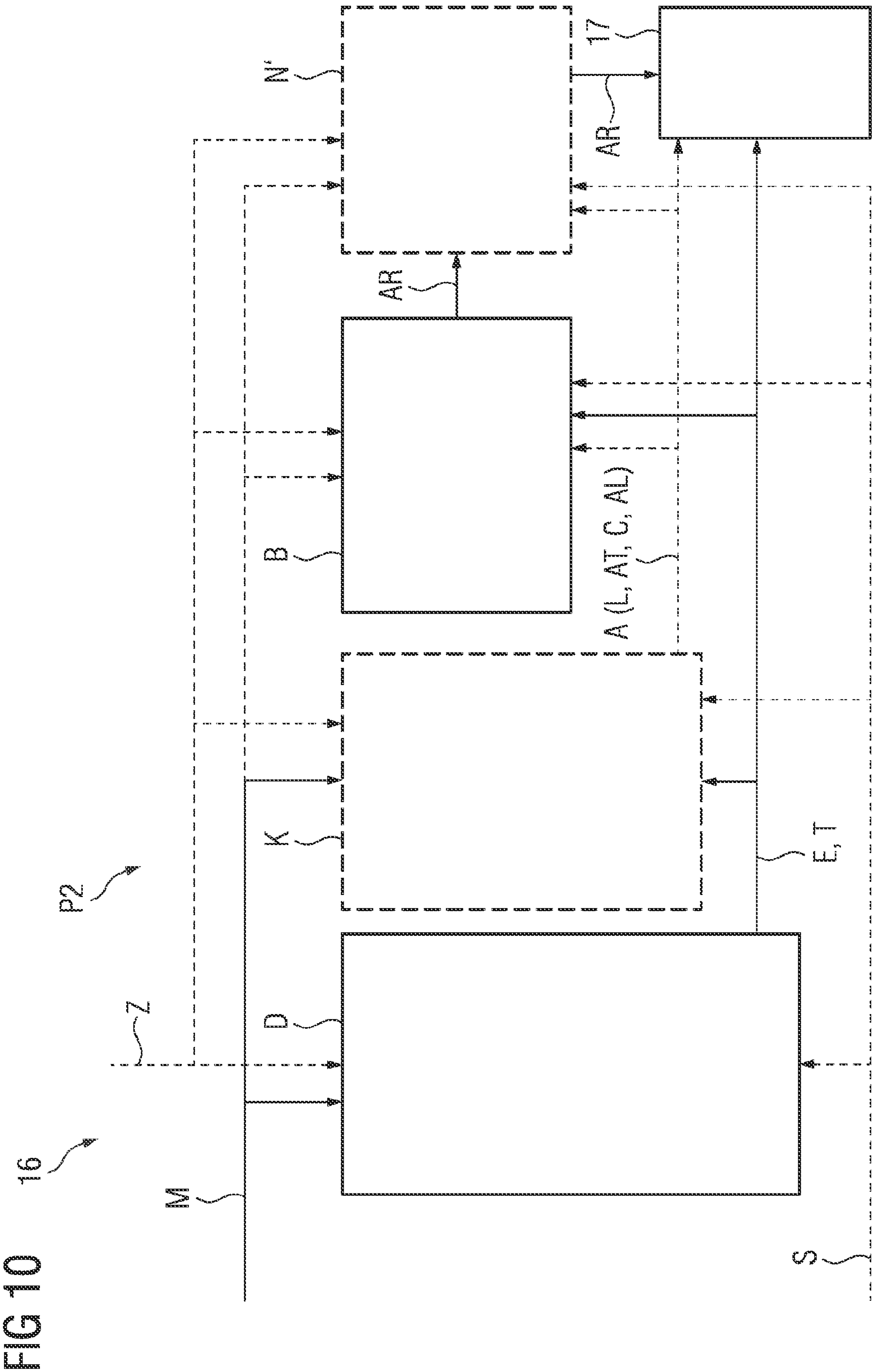
FIG. 10 shows a second exemplary embodiment of a data pipeline in an inventive anomaly detector.

In a data pipeline P2 shown in FIG. 10, compared to the data pipeline P1 of FIG. 9, the classification stage K is first followed by an evaluation stage B and thereafter by a postprocessing stage N'.

In the evaluation stage B, an anomaly relevance AR (i.e., a relevance of an anomaly determined) with regard to one or a number of operational or business objectives Z of the plant 1 is determined.

To this end, the evaluation stage B receives as its input variables the normal values E of the performance indicators L output by the stage D as well as times T of deviations of the performance indicators L from the normal values. Furthermore, the stage B receives as an input variable the anomaly information A created by the stage K.

Moreover, in the stage B, information about current operational or business objectives Z of the plant 1 is available. This information can already be permanently stored in the stage B, or for example be received by the stage B via the user interface 17. This information can be available, for example, in the form of weightings for the different performance indicators with regard to different operational or business objectives Z of the plant.

Depending on weighting, corresponding scores for the meaning of anomalies determined with regard to the achievement of the operational or business objectives are determined by the stage B and output as relevance AR of the respective anomaly for the operational or business objective or objectives Z.

The post-processing stage N' is used for filtering of the information determined in the preceding stages. For example, a suppression of non-relevant warnings or only less probable anomaly information, for example, taking into consideration of the histories of the measured data or the performance indicators. This also advantageously occurs as a function of the operational or business objectives Z.

As a result, only anomaly information (e.g., relevance, time area T, probable cause) and warnings or alarms for anomalies with sufficient relevance for their operational or business objective€ are thus displayed to the operator of the plant on a display, for example the user interface 17 of FIGS. 1-3 or the user interface 37 of FIG. 5.

Advantageously, the information about current operational or business objectives Z of the plant 1 is also available in stages D and K.

For example, with the aid of this information there can be a configuration of the data pipeline P2 or of the individual stages D, K, B, N', for example, for a selection and combination of especially suitable methods or models for data analysis or for a selection (or an extract) of data for further analysis. If, for example, it is known that a bad state in the training data does not have any influence of the most important performance indicators for an operational or business objective, then it can remain in the training data and does not have to be removed.

As already explained in conjunction with FIG. 9, the stage N' realizes a post-processing in order to enhance the quality of the anomaly identification. For this, post-processing, for example, anomalies that have been determined with other methods (for example, characteristic field methods or rule-based methods) or that originate from a classical model (hybrid), can be employed. This means that there is a validation of anomalies with anomalies determined in other ways. A specific behavior of the measured values can also be employed for validation of the anomalies.

As is furthermore indicated in FIG. 10, the stages D, K, B and N' can also be supplied with simulated sensor data S, which is created by the simulator (or digital twin) 9 of the production process 3.

This enables an initial training of the artificial intelligence 18 to be undertaken in the anomaly detector 16 or in den various stages of the data pipeline P2. Then, with the aid of the simulation data S and the actual real measured data M, hereafter the artificial intelligence in the data pipeline P2 can be continuously improved, in particular for a scale-up of production from laboratory scale through to a far larger-scale production plant. Thus, a digital triplet consisting of anomaly detector 16, simulator (digital twin) 9 and process data (measured sensor data M) focused on anomalies are produced, however not just from a technical perspective, but also from a perspective of the operational or business objectives of the plant 1.

The anomaly detector 16 can use deviations between the results of the simulator (or digital twin) 9 and the real process data (measured sensor data M) for validation of anomalies and thus for improving the accuracy of the anomaly detection and prediction. These deviations can likewise be supplied to the anomaly detector as time series data or be created by the detector. Thus, a faster implementation and a faster, more reliable use of the anomaly detector 16 is possible.

While any abnormalities that are detected by the simulator (or digital twin) 9 are usually resolved with the aid of engineering measures after technical/commercial discussions, the anomaly detector 16 acts directly with the operator of the plant and assists them in real time in decisions about suitable countermeasures for detected abnormalities. In particular, by contrast with the simulator (or digital twin), the anomaly detector is not required to focus on each individual abnormality. Instead, the anomaly detector can act as a filter and only pass on such anomalies as have a perceptible influence on operational or business objectives of the plant operator. This makes it possible for the plant operator to initiate immediate countermeasures for reducing the influence of the anomaly on the production process.

Here too, in the anomaly detector 16 or in the various stages of the data pipeline P2, unsupervised, supervised or semi-supervised learning methods as well as other learning algorithms can basically be used. Since, however, a way is now available to optimize directly with regard to known truth beyond simulations, supervised learning is preferably used in stage D. The decisive difference between approaches based on data without exact knowledge of the actual truth, such an unlabeled historical data, and data from simulations, lies in the fact that not only the abstract information, but the actual causes and more detailed correlations can be obtained.

In order to arrive at a hybrid solution, the artificial intelligence, e.g., a neural network, in combination with multiple data sources can be used. A few data sources can contain more detailed meta-information, other less detailed background knowledge, but realistic correlations for this, for example, from the real plant.

For example, a neural network could be used, which is pre-trained in a first step with data from a digital twin, which allows a few basic categories of anomalies to be learned, and that then in a second step is retrained based on historical plant data.

As an alternative, the artificial intelligence can also first be trained in a first step with real plant data with respect to correlations (unsupervised, semi-supervised or primarily supervised) and later improved in a second step, in order to make a connection between discovered patterns with relevant anomalies.

This does not necessarily have to be divided up into in different training phases but can also occur via data augmentation or by suitable mixing of data from various sources.

The advantages of this approach also do not have to be achieved by training of an individual algorithm but can be distributed between a number of learning or rule-based systems. For example, a division into a neural network that has been trained on historical data and a rule-based system or a supervised tree learning system can be undertaken.

The measured data that is used in the stages can be given by the rules of a rule-based part of the post-processing, by a trained neural network or as a result of a simulation model.

Figure 11:
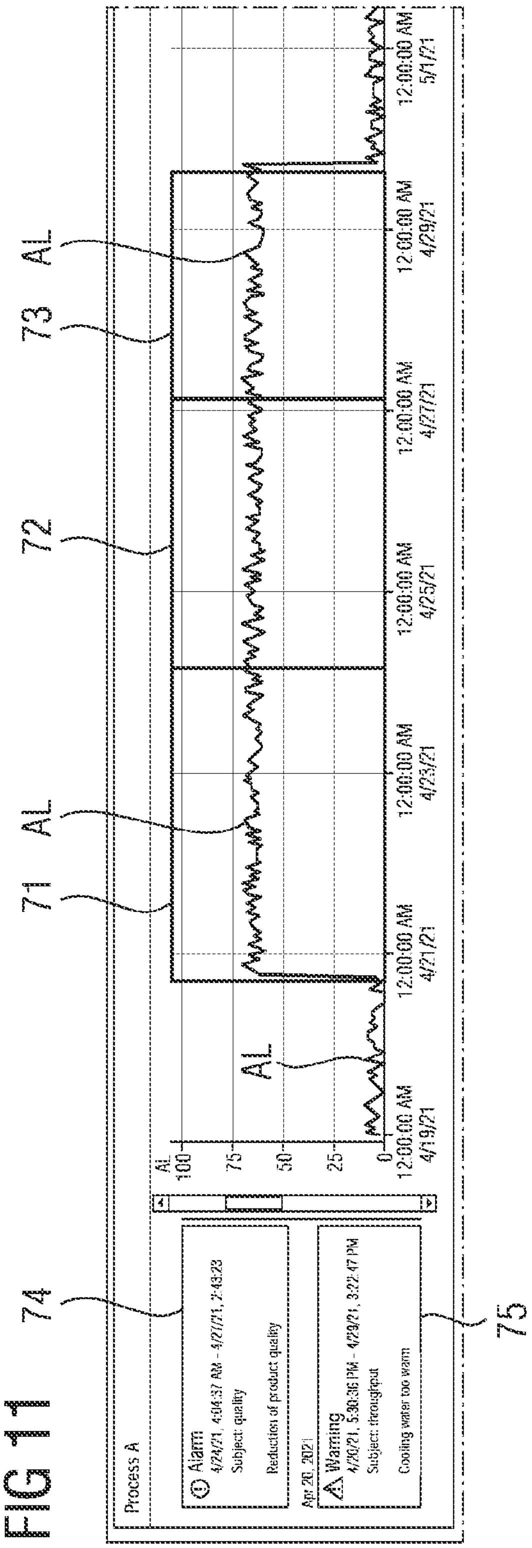
FIG. 11 shows an exemplary output of anomalies for a number of performance indicators with relevance information with respect to different operational or business objectives at a graphical user interface.

FIG. 11 shows an exemplary output of anomalies for a number of performance indicators with relevance information with regard to different operational or business objectives at a graphical user interface. In this example, an anomaly level AL, i.e., a probability of the presence of an anomaly, is plotted over the time t. The anomaly level AL takes account in this case of anomalies in a number of different performance indicators. In the areas 71 and 73, in this case, anomalies in the field of quality are present in each case. In area 72, on the other hand, an anomaly in the field of throughput is present. The current operational or business objective of the quality is given a greater importance than the throughput. As a result, an alarm 74 has been created with regard to the quality anomaly, but only a warning 75 with regard to the throughput anomaly.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An apparatus for identifying anomalies in an industrial plant for implementing a production process for a product, the industrial plant comprising a plurality of sensors for measuring process variables of the production process, the apparatus comprising:

- an anomaly detector including at least one trained artificial intelligence, which is configured and trained, based on a plurality of measured data of the plurality of sensors to at least one of detect and predict anomalies in the production process, the anomaly detector outputting anomaly information upon at least one of detection and prediction of an anomaly;
- wherein the anomaly detector is configured to detect and predict the anomalies at the same time for a plurality of different performance indicators of the production process, the different performance indicators each relating to the overall production process for the production of the product,
- wherein the anomaly information comprises a probability of a presence of the anomaly;
- wherein the performance indicators each comprise characteristic values, with the aid of which a degree of fulfilment with respect to an operational objective of the production process is measureable;
- wherein the performance indicators are measured process variables or a variable derived therefrom; and
- wherein the performance indicators are at least two different indicators selected from the group consisting of: (i) quality of a produced product, (ii) quantity of a produced product per unit of time comprising a throughput, (iii) energy consumption, (vi) water consumption, (v) raw materials consumption and (vi) emissions.

2. The apparatus as claimed in claim 1, further comprising:

- a configuration facility, which is configured to configure the anomaly detector including the artificial intelligence, as a function of at least one operational or business objective of the production process.

3. The apparatus as claimed in claim 1, wherein the artificial intelligence is jointly trained for all of the plurality of performance indicators.

4. The apparatus as claimed in claim 1, wherein the artificial intelligence is configured and trained to take into account at least one of (i) a temporal sequence of the measured data and (ii) temporal relationships between the measured data upon at least one of detection and prediction of the anomalies.

5. The apparatus as claimed in claim 1, wherein the artificial intelligence is at least partly trained with simulated measured data from sensors.

6. The apparatus as claimed in claim 1, wherein the anomaly detector is configured to implement at least one of validation of the anomaly detection and prediction aided by deviations between the measured data of the sensors and simulated measured data of the sensors.

7. A method for identifying anomalies in an industrial plant for implementing a production processes for a product, the industrial plant comprising a plurality of sensors for measuring process variables of the production process, the method comprising:

- a) receiving a plurality of measured data of the plurality of sensors;
- b) detecting and/or predicting anomalies in the production process based on the plurality of measured data utilizing at least one trained artificial intelligence;
- c) outputting anomaly information upon at least one of detecting and predicting an anomaly;
  - wherein, during step b), anomalies are detected and predicted at the same time for a plurality of different performance indicators of the production process, the different performance indicators each relating to an overall production process for the production of the product;
  - wherein the anomaly information comprises a probability of the presence of the anomaly;
  - wherein the performance indicators each comprise characteristic values, with the aid of which a degree of fulfilment with respect to an operational objective of the production process is measurable;
  - wherein the performance indicators comprise measured process variables or a variable derived therefrom; and
  - wherein the performance indicators are at least two different indicators selected from the group consisting of (i) quality of a produced product, (ii) quantity of a produced product per unit of time comprising a throughput, (iii) energy consumption, (iv) water consumption, (v) raw materials consumption and (vi) emissions.

8. The method as claimed in claim 7, wherein a relevance of the anomaly with regard to at least one of a plurality of different operational or business objective(s) of the production process is determined for at least one of a detected and predicted anomaly.

9. The method as claimed in claim 7, wherein the artificial intelligence is jointly trained for all of the plurality of performance indicators.

10. The method as claimed in claim 8, wherein the artificial intelligence is jointly trained for all of the plurality of performance indicators.

11. The method as claimed in claim 7, wherein the artificial intelligence is configured and trained to take into account at least one of (i) a temporal sequence of the measured data and (ii) temporal relationships between the measured data upon at least one of detection and prediction of the anomalies.

12. The method as claimed in claim 8, wherein the artificial intelligence is configured and trained to take into account at least one of (i) a temporal sequence of the measured data and (ii) temporal relationships between the measured data upon at least one of detection and prediction of the anomalies.

13. The method as claimed in claim 9, wherein the artificial intelligence is configured and trained to take into account at least one of (i) a temporal sequence of the measured data and (ii) temporal relationships between the measured data upon at least one of detection and prediction of the anomalies.

14. The method as claimed in claim 7, wherein the artificial intelligence is trained, at least in part, with simulated measured data of sensors.

15. The method as claimed in claim 7, wherein a validation of at least one of the anomaly detection and prediction is undertaken aided by deviations between the measured data of the sensors and simulated measured data of the sensors.

16. A method for providing a trained artificial intelligence for identification of anomalies in an industrial plant for implementing a production process for a product, the plant comprising a plurality of sensors for measurement of process variables of the production process, the method comprising:

receiving input training data which represents measured data of the sensors;

receiving output training data which represents anomalies in the measured data, the output training data comprising assignments to a plurality of different performance indicators of the production process, and the plurality of different performance indicators each relating to an overall production process for the production of the product;

wherein the performance indicators each comprise characteristic values, with the aid of which a degree of fulfilment with respect to an operational objective of the production process is measureable;

wherein the performance indicators comprise measured process variables or a variable derived therefrom;

wherein the performance indicators are at least two different indicators selected from the group consisting of (i) quality of a produced product, (ii) quantity of a produced product per unit of time comprising a throughput, (iii) energy consumption, (iv) water consumption, (v) raw materials consumption and (iv) emissions; and wherein the method further comprises:

training the artificial intelligence based on the input training data and the output training data such that these anomalies are detected and predicted at the same time for the plurality of different performance indicators in the production process and, upon at least one of detecting and predicting an anomaly, an anomaly information is output, the anomaly information comprising a probability of a presence of the anomaly; and providing the trained artificial intelligence.

* * * * *